United States Patent
Jung et al.

(10) Patent No.: US 7,054,317 B1
(45) Date of Patent: May 30, 2006

(54) METHOD FOR CONTROLLING TRANSMISSION CONTROL PROTOCOL WINDOW SIZE IN ASYNCHRONOUS TRANSFER MODE NETWORK

(75) Inventors: Jae Il Jung, Seoul (KR); Sung Won Kang, Taejeon (KR); Young Soo Seo, Taejeon (KR)

(73) Assignees: Korea Telecommunication Authority, Kyunggi-do. (KR); Jae Il Jung, Seoul (KR)

( * ) Notice: Subject to any disclaimer, the term of this patent is extended or adjusted under 35 U.S.C. 154(b) by 0 days.

(21) Appl. No.: 09/439,206

(22) Filed: Nov. 12, 1999

(30) Foreign Application Priority Data

May 14, 1999 (KR) ................................. 1999-17310

(51) Int. Cl.
*H04L 12/56* (2006.01)
(52) U.S. Cl. .................. 370/395.1; 370/236.1
(58) Field of Classification Search ........ 370/229–232, 370/235, 236.1, 395.1, 252, 236.2, 238.1, 370/389, 396, 233, 395.5, 395.52
See application file for complete search history.

(56) References Cited

U.S. PATENT DOCUMENTS

| | | | |
|---|---|---|---|
| 5,805,577 A | | 9/1998 | Jain et al. |
| 6,208,653 B1* | | 3/2001 | Ogawa et al. ............... 370/395 |
| 6,252,851 B1* | | 6/2001 | Siu et al. ..................... 370/236 |
| 6,370,114 B1* | | 4/2002 | Gullicksen et al. ......... 370/229 |
| 6,490,251 B1* | | 12/2002 | Yin et al. ................ 370/236.1 |

* cited by examiner

*Primary Examiner*—Brenda Pham
(74) *Attorney, Agent, or Firm*—Merchant & Gould P.C.

(57) ABSTRACT

The present invention relates to a method for controlling a transmission control protocol window size in an asynchronous transfer mode which determines a TCP congestion window size by using an explicit rate value in a resource management cell. According to the present invention, cells transmitted pursuant to the explicit rate value are rarely dropped or tagged by a switch algorithm, thereby reducing a ratio of transmission.

5 Claims, 2 Drawing Sheets

METHOD FOR CONTROLLING TRANSMISSION CONTROL PROTOCOL WINDOW SIZE IN ASYNCHRONOUS TRANSFER MODE NETWORK

BACKGROUND OF THE INVENTION

1. Field of the Invention

The present invention relates to a method for controlling a transmission control protocol (hereinafter, referred to as 'TCP') window size in an asynchronous transfer mode (hereinafter, referred to as 'ATM') network, and in particular to a method for determining a TCP congestion window size by using an explicit rate (hereinafter, referred to as 'ER') value in a resource management (hereinafter, referred to as 'RM') cell.

2. Description of the Background Art

In general, an available bit rate ABR service has been developed to support a data application in the ATM network, and the TCP is the most widely-used transport level protocol in a currently-used data network.

A TCP window-based flow control is a method for predicting a packet loss by employing an acknowledgement (ACK) signal transmitted from a receiving side. The aforementioned method can detect a congestion state of the network only when the packet loss is generated. Sometimes, the retransmission may be unnecessarily performed by mistakenly predicting the packet loss.

Here, a method for predicting the packet loss detects the congestion state of the network by predicting the packet loss by using a TCP timeout. However, this method has a disadvantage in that a degree of the congestion state of the network cannot be measured because a feedback of the TCP is provided merely by the receiving side TCP.

As described above, the TCP window-based flow control predicts the packet loss, and thus increases/decreases the window size. However, the congestion state of the network cannot be precisely evaluated by a simple increase/decrease of the window size. Accordingly, the window size may exceed an allowable size in the network. At this time, the packet loss and the resultant retransmission are generated, and thus the increase/decrease of the window size and retransmission are repeated.

In addition, since a delay sharply varies according to the network state on the TCP over the ABR service, a retransmission timeout (hereinafter, referred to as 'RTO') value also increases. In case the packet loss is generated, the loss may be detected after the RTO. As a result, the level of performance ability considerably reduces. According to the fast-retransmission algorithm of the TCP-Reno ("TCP/IP Illustrated Volume 1: The Protocols" by W. Richard Stevens (Addison-Wesley, 1994), more than a half of the packet loss can be detected before the RTO, and according to the method suggested by the TCP-Vegas (Lawrence S. Brakmo and Sean W. O'Malley, "TCP Vegas: New Techniques for Congestion Detection and Avoidance", SIGCOMM '94 Conference on Communications Architectures and Protocols, pp. 24–35, October 1994), more than a half of the residual packet loss can be detected in advance, thereby reducing the number of cases of waiting the RTO. Nevertheless, the decrease and recovery of the window size resulting from the retransmission reduce a TCP throughput.

In the conventional TCP over the ABR service, a bandwidth which can be used by the TCP is dependent upon time. Accordingly, a fast recovery to the bandwidth and transmission by a linear increase from the time are not significant.

SUMMARY OF THE INVENTION

Accordingly, it is an object of the present invention to provide a method for controlling a transmission control protocol (TCP) window size in an asynchronous transfer mode (ATM) network by employing resource management (RM) cell information of an available bit rate (ABR) service.

In order to achieve the above-described object of the present invention, there is provided a method for computing a window size by using congestion information of a network during data transmission from a transmitting side ATM terminal to a receiving side ATM terminal, an explicit rate value in a resource management (RM) cell being used as the congestion information.

In addition, in order to achieve the above-described object of the present invention, there is provided a method for controlling a transmission control protocol window size in an asynchronous transfer mode network, including: a step for an ATM transmitting terminal to receive a resource management (RM) cell; a step for transmitting an explicit rate value in the received resource management (RM) cell to a transmission control protocol (TCP) level in the ATM transmitting terminal; a step for setting a congestion window to be '1' when the explicit rate value is received; a step for computing the congestion window, when an acknowledgment signal is received from an ATM receiving terminal; and a step for computing a window size, when the congestion window value is computed, and for transmitting a data to the ATM receiving terminal according to the computed size.

BRIEF DESCRIPTION OF THE DRAWINGS

The present invention will become better understood with reference to the accompanying drawings which are given only by way of illustration and thus are not limitative of the present invention, wherein:

FIG. 1 is a schematic block diagram illustrating a network constitution for providing a transmission control protocol over an available bit rate service which the present invention adapts to.

DETAILED DESCRIPTION OF THE PREFERRED EMBODIMENTS

Figure 1:
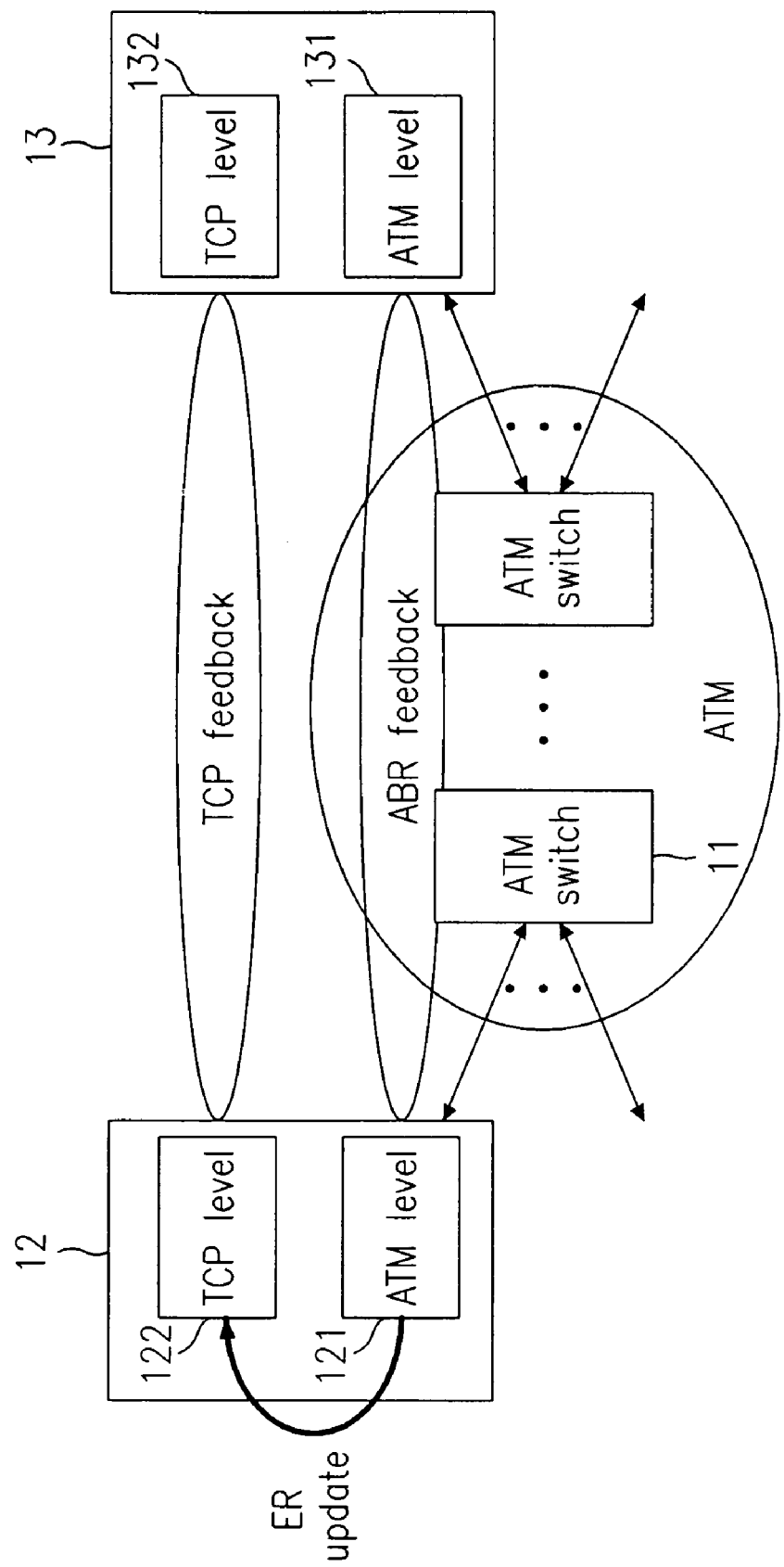

A method for controlling a transmission control protocol (TCP) window size in an asynchronous transfer mode (ATM) network in accordance with a preferred embodiment of the present invention will now be described in detail with reference to the accompanying drawings.

An algorithm used in accordance with the present invention is an explicit rate (ER) mode available bit rate (ABR) switch algorithm.

An ER field in a resource management (RM) cell used by the ABR stores a minimum value of throughputs which each node of the network can receive, and returns to a transmitting side. When the ER value is transmitted to a TCP level, the TCP can detect a state of the network before the packet loss, and prepare for the packet loss, thereby improving the performance of the TCP.

To use the ER value guarantees fairness and stability of each ATM virtual circuit, and thus guarantees fairness and stability of each TCP connection.

The TCP window size control algorithm in accordance with the present invention will now be described.

ATM level transformation of the transmitting side terminal.

When the RM cell is received, the ER value in the RM cell is transmitted to the TCP.

TCP level transformation of the transmitting side terminal.

The TCP transmitting side sets the following relationship in every acknowledgment (ACK) signal.

$$awnd=\text{MIN [credit, cwnd]} \quad (1)$$

Here, 'awnd' implies an allowed window, 'credit' implies an amount of data which the TCP receiving side can receive, and 'cwnd' implies a congestion window, respectively.

At this time, a value of 'cwnd' is determined by mapping the ER value and preceding 'cwnd' value, different from the conventional method for controlling the TCP window size.

The mapping enables the TCP transmitting side to determine an optimal window size, thus preventing congestion of the network. In addition, it is possible to efficiently use the bandwidth which can be provided to a given TCP connection.

'cwnd' which is the TCP congestion window size is determined by the mapping, as follows. Firstly, a throughput of the TCP level is computed by the following Expression.

$$TCP\ throughput = \text{last\_ER} * \frac{48}{53} * \frac{31}{32} * \frac{TCP\_MSS}{TCP\_MSS + 56\ \text{bytes}} \quad (2)$$

Here, 'TCP_MSS' implies a maximum segment size of the TCP level. When overheads of the ATM cell, the RM cell, the TCP, the internet protocol (IP), the ATM adaptation layer 5 (AAL5) and an internet engineering task force request for comments 1577 (RFC 1577) are removed from the 'last_ER' value, the bandwidth which can be used by the connection over the ABR, the throughput of the TCP level is computed.

$$cwnd=TCP\ \text{throughput}*estimated\_RTT*safety\_factor \quad (3)$$

Here, 'estimated_RTT' is an estimated round trip time, and 'safety_factor' is a numerical value compensating for variations in the network state and RTT.

The computed value is multiplied by an appropriate saftey_factor(s<1), and thus a sharp variation of the network state and influence of the incorrect RTT are compensated, thereby controlling the throughput of the TCP level. The retransmission mechanism of the conventional TCP is used as a retransmission mechanism.

FIG. 1 is a constitutional diagram illustrating the TCP service over the ABR service to which the present invention adapts, and shows feedback control loops of the TCP level and the ATM level.

The ATM level 121 of the ATM transmitting terminal 12 consecutively receives the RM cell which returns through the network. The ER value of the RM cell is transmitted to the TCP level 122 of the ATM transmitting terminal 12 as it is. The TCP level 122 of the ATM transmitting terminal 12 receiving the ER value computes the allowed window size (awnd), as shown in Expression (1), by using the congestion window size (cwnd) decided by the ER value and 'credit' which is the feedback control loop information of the TCP level.

As depicted In FIG. 1, reference numerals 11, 131 and 132 denote an ATM switch, an ATM level of the ATM receiving terminal 13, and a TCP level thereof, respectively.

Figure 2:
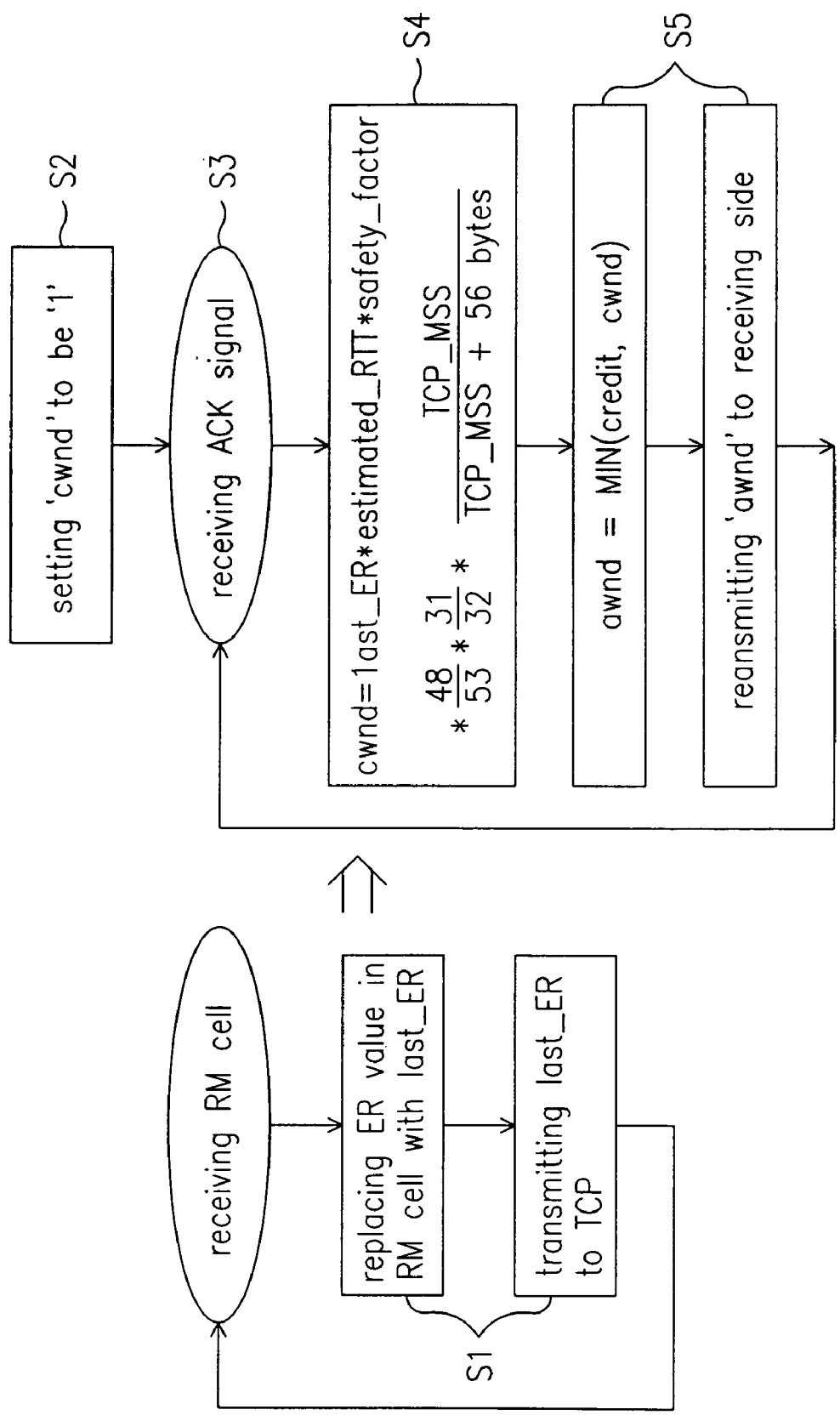
FIG. 2 is a flowchart showing sequential steps of a control process for a window size on the transmission control protocol in accordance with the present invention.

FIG. 2 is a flowchart showing the method for controlling the TCP window size in accordance with the present invention, and shows sequential steps of the information transmission between the ATM level 121 and the TCP level 122 of the ATM transmitting terminal 12, and the computation of the allowed window size (awnd).

Firstly, when receiving the RM cell of the ABR feedback control loop, the ATM level 121 of the ATM transmitting terminal 12 replaces the value thereof with the 'last_ER' value, and transmits the replaced value to the TCP level 122 (S1).

The TCP level 122 of the ATM transmitting terminal 12 receiving the 'last_ER' value computes the allowed window size (awnd). Here, the TCP level 122 of the ATM transmitting terminal 12 sets 'cwnd' to be '1' at an initial stage (S2). The decision of the allowed window size (awnd) is driven when the acknowledgement (ACK) signal is received (S3). The 'cwnd' value is computed by Expressions (2) and (3) (S4).

In addition, the allowed window size (awnd) is computed as shown in Expression (1), and a transmittable amount thereof at that point is transmitted to the receiving side (S5).

After computing the allowed window size (awnd), the conventional TCP algorithm is applied as it is. Here, the allowed window size (awnd) indicates the right edge of the sliding window at the present point. The transmittable amount is a difference between the 'awnd' value and an amount of the data which have been lastly transmitted (namely, the amount of data which do not receive the acknowledgement (ACK) signal). Here, the transmission can be performed only when the value is positive.

Tables 1 and 2 as shown below are simulation results for measuring the TCP performance when the algorithm according to the present invention is applied. The throughput (Mbps) and the ratio of retransmission (%) are computed by using a performance parameter of the TCP. The throughput is computed by dividing transmission amount by transmission time, and the ratio of retransmission is computed by dividing the number of the retransmitted packets by the number of the transmitted packets.

The simulation is carried out in a state where five users of a file transfer protocol (FTP) operated over the ABR service and n users of an on-off constant bit rate (CBR) share a link of 150 Mbps. In order to presume the local area network (LAN) and the wide area network (WAN) environment, in the length of the links ($l_1$, $l_2$, $l_3$), the simulation is performed in regard to the lengths of 1 Km, 100 Km, 1 Km and 0.1 Km, 1 Km, and 0.1 Km, respectively.

Parameters used for the simulation will now be listed.

Link capacity=150 Mbps

Link buffer=1,000 cells (for on-off CBR users), 2,500 cells (for FTP users)

On-off CBR source on time=84 ms, off time=84 ms

TCP maximum segment size (MSS)=9,140 bytes

TCP timer granularity=50 ms

TCP maximum window size=20 segments=182,800 bytes

User buffer size=1,000,000 cells

ABR Nrm (number of cells between forward RM cells)=32

Peak cell rate (PCR)=150 Mbps

Minimum cell rate (MCR)=0.1 Mbps

Initial cell rate (ICR)=5 Mbps

Rate Increase Factor (RIF)=1
Rate Decrease Factor (RDF)=1
Transient buffer exposure (TBE)=512 cells In order to evaluate performance when only the TCP employs a fixed bandwidth, it is presumed that a background traffic does not exist. In addition, for the states where a burstiness of the network is large and small, one 100 Mbps on-off CBR user and ten 10 Mbps users are presumed. The five 10 Mbps users are presumed to observe the operation of an algorithm suggested when the resources of the network are plentiful.

In the respective network states, the simulation is performed by varying the safety_factor(s). The following Tables show the results of the simulation.

TABLE 1

Simulation result in wide area network

| Background Traffic | Performance Parameter | Before Variation | After Variation |||||||
|---|---|---|---|---|---|---|---|---|
| | | | $s = 0.2$ | $s = 0.3$ | $s = 0.4$ | $s = 0.5$ | $s = 0.6$ | $s = 0.7$ |
| 0 Mpbs | Processing Ability | 92.6 | 126.0 | 126.0 | 128.8 | 128.8 | 129.2 | 121.8 |
| | Ratio of Retransmission | 14.4 | 2.1 | 2.1 | 0.8 | 0.5 | 0.5 | 3.7 |
| 100 Mbps*1 | Processing Ability | 67.4 | 82.3 | 82.7 | 83.3 | 81.6 | 78.7 | 75.5 |
| | Ratio of Retransmission | 9.7 | 4.5 | 1.0 | 2.2 | 3.4 | 6.2 | 7.3 |
| 10 Mbps*10 | Processing Ability | 65.6 | 85.5 | 86.0 | 83.9 | 82.0 | 77.5 | 74.1 |
| | Ratio of Retransmission | 10.9 | 1.7 | 1.0 | 2.2 | 3.4 | 6.2 | 8.4 |
| 10 Mbps*5 | Processing Ability | 75.6 | 105.9 | 107.0 | 107.6 | 105.8 | 100.5 | 94.4 |
| | Ratio of Retransmission | 15.0 | 1.8 | 1.3 | 0.8 | 1.7 | 4.4 | 7.4 |

TABLE 2

Simulation result in local area network

| Background Traffic | Performance Parameter | Before Variation | After Variation |||||||
|---|---|---|---|---|---|---|---|---|
| | | | $s = 0.2$ | $s = 0.3$ | $s = 0.4$ | $s = 0.5$ | $s = 0.6$ | $s = 0.7$ | $s = 0.8$ |
| 0 Mpbs | Processing Ability | 94.2 | 91.4 | 98.2 | 104.1 | 114.3 | 122.4 | 121.8 | 115.9 |
| | Ratio of Retransmission | 14.0 | 14.2 | 12.8 | 11.2 | 7.1 | 3.7 | 3.8 | 6.3 |
| 100 Mbps*1 | Processing Ability | 67.4 | 67.3 | 70.0 | 72.6 | 75.1 | 76.6 | 74.9 | 73.2 |
| | Ratio of Retransmission | 10.3 | 11.1 | 11.2 | 10.4 | 8.9 | 7.5 | 8.0 | 8.9 |
| 10 Mbps*10 | Processing Ability | 65.8 | 65.8 | 70.5 | 74.9 | 79.4 | 78.6 | 75.6 | 73.5 |
| | Ratio of Retransmission | 10.6 | 12.2 | 11.0 | 8.3 | 5.3 | 5.7 | 7.7 | 9.1 |

TABLE 2-continued

Simulation result in local area network

| Background Traffic | Performance Parameter | Before Variation | After Variation | | | | | |
|---|---|---|---|---|---|---|---|---|
| | | | s = 0.2 | s = 0.3 | s = 0.4 | s = 0.5 | s = 0.6 | s = 0.7 | s = 0.8 |
| 10 Mbps*5 | Processing Ability | 76.6 | 78.3 | 82.2 | 89.2 | 98.3 | 101.4 | 96.8 | 92.8 |
| | Ratio of Retransmission | 14.8 | 13.5 | 12.9 | 10.3 | 5.8 | 4.0 | 6.3 | 8.4 |

As shown in the above Tables, the TCP performance is improved by using the suggested method in every background traffic. The window size of the conventional TCP increases regardless of the network state, and repeats the information loss, the resultant retransmission and the increase of the window size. However, when the algorithm in accordance with the present invention is applied, the window size is flexibly varied according to the network state.

In regard to performance of the TCP, in the case that the safety_factor(s) is approximately to 0.5, the throughput is considerably improved and the ratio of retransmission is reduced in both the local area network and the wide area network. As a result, in addition to improvement of the throughput, the ratio of retransmission is decreased, thereby reducing unnecessary consumption of the network resources.

That is to say, when the safety_factor(s) is 0.5, the throughput increases by 10.27% to 28.3 according to the network states, and the ratio of retransmission decreases remarkably.

It is thus confirmed that the TCP performance is considerably improved by using the TCP window size control algorithm suggested for the TCP service over the ABR service in accordance with the present invention.

For reference, the technical matters of the present invention have been published in 'The Korean Communication Institute' on Nov. 14, 1998, entitled by 'Performance improvement of TCP over ATM by using RM cell information'.

As discussed earlier, in accordance with the present invention, the cells transmitted pursuant to the ER value are rarely dropped or tagged by the switch algorithm, thereby reducing the ratio of retransmission.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for controlling a transmission control protocol window size in an asynchronous transfer mode network, comprising:
   receiving a resource management cell in an ATM transmitting terminal;
   transmitting an explicit rate value in the received resource management cell to a transmission control protocol level in the ATM transmitting terminal;
   setting a congestion window size to an initial value, when the explicit rate value is received;
   computing the congestion window size, when an acknowledgment signal is received from an ATM receiving terminal; and
   computing a window size, when the congestion window size is computed, wherein the window size is set to a lesser of the congestion window size and a maximum window size capable of being received by the ATM receiving terminal; and
   transmitting data to the ATM receiving terminal according to the computed window size.

2. The method of according to claim 1, wherein setting a congestion window size to an initial value comprises setting the congestion window size to '1'.

3. The method according to claim 1, wherein the congestion window size is calculated based on a transmission control throughput, an estimated round trip time of a packet, and a numeric value compensating for variations in network states.

4. The method of claim 3, wherein the transmission control protocol throughput is determined based on the explicit rate value in the resource management cell and a maximum segment size of the transmission control protocol level.

5. A method for controlling a transmission control protocol window size in a asynchronous transfer mode network by using an explicit rate value in a resource management cell of a network during data transmission from a transmitting side ATM terminal to a receiving side ATM terminal, the receiving side ATM terminal being configured to receive a maximum window size of data, the method comprising:
   determining the maximum window size capable of being received by the receiving side ATM terminal;

determining a congestion window, the congestion window being calculated based on a transmission control protocol throughput, an estimated round trip time of a packet, and a numeric value compensating for variations in network states, the transmission control protocol throughput being determined based on the explicit rate value in the resource management cell and a maximum segment size of a transmission control protocol level; and setting the window size to the lesser of the congestion window size and the maximum window size capable of being received by the receiving side ATM terminal.

* * * * *